UNITED STATES PATENT OFFICE.

EUDO MONTI, OF TURIN, ITALY.

PROCESS OF DIGESTING AND CONCENTRATING PROTEIN IN ANY FORM BY DISSOLVING IT IN GRAPE-JUICE.

1,226,983. Specification of Letters Patent. Patented May 22, 1917.

No Drawing. Original application filed March 5, 1914, Serial No. 822,763. Divided and this application filed May 26, 1915. Serial No. 30,649.

*To all whom it may concern:*

Be it known that I, EUDO MONTI, a subject of the King of Italy, residing at 20 Via Figlie dei Militari, Turin, Italy, have invented certain new and useful Improvements in Processes of Digesting and Concentrating Protein in Any Form by Dissolving it in Grape-Juice, of which the following is a specification.

The present invention is a divisional application from my copending application Serial No. 822,763 filed March 5, 1914, and it resides in a process of digesting protein, as it occurs in egg, milk, blood, meat and the like, by dissolving it in grape juice and subsequently concentrating the product.

In carrying out this invention, I preferably utilize the grape juice, or juice from other berries derived in the manner described in my above named application with the assistance of the apparatus described in one of my recent patents. The protein is first stirred in the grape or berry juice, whether natural or concentrated, at a temperature between 35° and 40° C. The protein will then be completely dissolved and digested in the juice. The resulting product is thereupon concentrated in a lukewarm concentrator until it contains no more than one third of its weight of moisture. In that condition it will now keep for any length of time and will not alter even if kept in contact with air at summer temperature.

The digestion will so modify the constitution of albumin that it will not curdle by heating and, though not yet peptonized, will peptonize quickly under proper conditions, while, if it had not been previously digested in must, it would take hours and a much larger quantity of pepsin to obtain the same result; also the phosphated oil and the phosphated albumin contained in eggs, the butter and the casein contained in milk thus treated, if diluted in lukewarm or even cold water, will emulsify so that they will separate but very slowly from the water, and they are in this form very easily digested in a much shorter time than it would take to peptonize the natural milk, eggs or meat. The hematin contained in blood emulsified with grape juice in the way above described, will combine with it in such form, that it will remain unaltered even if the product is boiled, and so will the albumin contained in the serum. It is, therefore, easy to concentrate all the organic phosphorus contained in eggs and grapes and all the organic iron contained in several times its weight of blood, into a small quantity of unaltered and soluble extract, which sterilizes without curdling, thus avoiding the objection many physicians have to the use of blood as a way of administering organic iron on account of the danger of possible infection. The extracts thus obtained are very agreeable to the taste and are very easily assimilated even by individuals who would not digest or assimilate the natural eggs, blood or meat.

I claim:—

1. A process of digesting and concentrating protein as occurring in egg, milk, blood, meat and the like, consisting in first dissolving the protein, in juice from berries, such as grapes and the like, at a temperature between 35° and 40° C., and thereupon concentrating the product.

2. A process of digesting and concentrating protein as occurring in egg, milk, blood, meat and the like, consisting in first dissolving the protein, in juice from berries, such as grapes and the like, and thereupon concentrating the product while keeping it at lukewarm temperature.

3. A process of digesting and concentrating protein as occurring in egg, milk, blood, meat and the like, consisting in first dissolving the protein, in juice from berries, such as grapes and the like, and thereupon concentrating the product while keeping it at luke warm temperature until it contains no more than one-third of its weight of moisture.

4. A process of digesting and concentrating protein as occurring in egg, milk, blood, meat and the like, consisting in first dissolving under continuous stirring the protein, in juice from berries, such as grapes and the like at a temperature between 35° and 40° C., and thereupon concentrating the product while keeping it at lukewarm temperature until it contains no more than one-third of its weight of moisture.

The foregoing specification signed at Turin, Italy, this 22nd day of April, 1915.

EUDO MONTI.

In presence of—
GIACOSA EUGENIO,
CRIVELLO GRALO.